(12) United States Patent  (10) Patent No.: US 7,802,759 B2
Ishikawa et al.  (45) Date of Patent: Sep. 28, 2010

(54) AIRCRAFT WING, AIRCRAFT WING COMPOSITE MATERIAL, AND METHOD OF MANUFACTURE THEREOF

(75) Inventors: Takashi Ishikawa, Tokyo (JP); Yutaka Iwahori, Tokyo (JP); Tomohiro Yokozeki, Tokyo (JP); Shin-ichi Takeda, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 1324 days.

(21) Appl. No.: 11/298,502

(22) Filed: Dec. 12, 2005

(65) Prior Publication Data

US 2006/0145031 A1 Jul. 6, 2006

(30) Foreign Application Priority Data

Dec. 16, 2004 (JP) ............................. 2004-364569

(51) Int. Cl.
*B64C 3/26* (2006.01)
(52) U.S. Cl. ................................. 244/123.12
(58) Field of Classification Search ............ 244/123.12, 244/123.1, 123.14, 123.7, 123.5, 123.6
See application file for complete search history.

(56) References Cited

U.S. PATENT DOCUMENTS

| 1,751,957 | A | * | 3/1930 | Towle ................... 244/123.12 |
| 2,645,435 | A | * | 7/1953 | Pouit ........................... 244/15 |
| 3,388,522 | A | * | 6/1968 | Lowes ................... 244/123.12 |
| 3,893,639 | A | * | 7/1975 | Croswell, Jr. ............... 244/219 |
| 4,198,018 | A | * | 4/1980 | Brault ........................ 244/119 |
| 4,232,093 | A | * | 11/1980 | Miller ........................ 428/591 |
| 4,538,780 | A | * | 9/1985 | Roe ........................ 244/123.5 |
| 6,199,796 | B1 | | 3/2001 | Reinhard et al. |

* cited by examiner

*Primary Examiner*—Tien Dinh
(74) *Attorney, Agent, or Firm*—Westerman, Hattori, Daniels & Adrian, LLP

(57) ABSTRACT

To provide an aircraft wing which has both high bending flexibility in the wing chord direction and high capacity to maintain the wing shape in the wing span direction, and to which morphing aircraft technology can be applied in the high-speed regime where aerodynamic forces are high.

The wing is formed by arranging a plurality of CFRP rods having maximum anisotropic stiffness in the axial direction, so as to be parallel to the wing span direction, and filling the gaps between the CFRP rods with an elastic material.

10 Claims, 10 Drawing Sheets

AIRCRAFT WING, AIRCRAFT WING COMPOSITE MATERIAL, AND METHOD OF MANUFACTURE THEREOF

BACKGROUND OF THE INVENTION

1. Field of the Invention

The present invention relates to an aircraft wing, aircraft wing composite material, and method of manufacture thereof. More particularly the present invention relates to an aircraft wing which has both high bending flexibility in the wing chord direction and high load bearing capacity and high capacity to maintain the wing shape in the wing span direction, and to which morphing aircraft technology can be applied in the high-speed regime where aerodynamic forces are high. The present invention also relates to an aircraft wing composite material and method of manufacture thereof.

2. Description of the Related Art

Research and development into technology, in which the shape of wings can be changed arbitrarily to improve the flight performance and characteristics of aircraft just like birds (hereinafter referred to as "morphing aircraft technology"), is being carried out mainly in the USA. Aircraft wings to which morphing aircraft technology can be applied require both high bending flexibility in the wing chord direction and high capacity to maintain the wing shape in the wing span direction.

In the prior art, in order to provide high bending flexibility in the wing chord direction and high capacity to maintain the wing shape in the wing span direction, air-filled wings are known (for example, JPO's patent Publication No: H11-512998). These wings include an external part with an upper skin and lower skin formed from an airtight woven substrate material, and an internal part with woven webs formed from an airtight woven substrate material. A plurality of void cells are formed in the upper and lower skins and the woven webs. Supplying compressed air to or reducing compressed air from the void cells can change both the wing height and shape or, air storage channels with airtightness are formed in the upper and lower skins and the woven webs, and supplying compressed air to or reducing compressed air from the air storage channels can change both the wing height and shape.

Also, air-filled wings made from a rubber material, in which pipes are passed through the inside and the internal pressure in the wing can be adjusted to change the cross-sectional shape of the wing by supplying compressed air to or reducing compressed air from the inside through the pipes, are known.

Furthermore, wings made from shape memory alloys or piezoelectric materials capable of changing their shape and angle are known.

In the above-mentioned air-filled wings, bending flexibility can be ensured in the wing chord direction by adjusting the pressure of the air filling the wing. However, air is a compressible fluid, so the wing span direction will also have bending flexibility in the same way. Therefore, high bending flexibility in the wing chord direction together with high capacity to maintain the wing shape in the wing span direction is not achieved. The other wings also do not achieve high bending flexibility in the wing chord direction together with high capacity to maintain the wing shape in the wing span direction as in the case of the air-filled wings.

From a viewpoint of achieving both high bending flexibility in the wing chord direction together with high capacity to maintain the wing shape in the wing span direction, it is easy for those skilled in the art to conceive of a wing made from an anisotropic composite such as carbon fiber-reinforced plastic (hereafter referred to as "CFRP") instead of the above woven substrate or rubber material. In other words, in a wing made from carbon fiber-reinforced plastic with the carbon fiber aligned unidirectionally in the wing span direction, the bending stiffness in the wing span direction (Ds) is high due to the strength anisotropy of the carbon fiber, and the bending stiffness in the chord direction perpendicular to the wing span direction (Dc) is lower.

However, in the above wing made from CFRP, if the stiffness in the wing span direction is increased, the stiffness in the chord direction also increases. On the contrary if the stiffness in the wing chord direction is reduced, the stiffness in the wing span direction is also reduced. As a result, the optimum stiffness ratio (Dc:Ds) is 1:15 at most, which is insufficient for application to a wing for morphing aircraft technology where the stiffness requirement is Dc:Ds=1:100 or greater. At the stiffness level, the strength in the wing chord direction is also insufficient for the application of morphing aircraft technology.

Also, it is easy for those skilled in the art to conceive of a wing made from a rubber material reinforced in one direction, for example carbon fiber-reinforced rubber (CFRR), instead of a plastic material reinforced in one direction. In other words, in a wing made from carbon fiber-reinforced rubber with the carbon fiber aligned unidirectionally in the wing span direction, the stiffness increases in the wing span direction due to the strength anisotropy of the carbon fiber, while the stiffness in the wing chord direction reduces due to the elastic action of the rubber. As a result, it is possible to achieve stiffness ratios of 1:100 or greater.

However, in unidirectionally reinforced rubber materials the compressive strength of the wing is low in the fiber direction, in other words, the wing span direction. Therefore, there is a problem of loss of load bearing capacity in the above wings made from CFRR due to bending forces caused by aerodynamic forces in the high-speed regime where aerodynamic forces are high.

SUMMARY OF THE INVENTION

From the viewpoint of the forgoing problems, it is an object of the present invention to provide an aircraft wing which has both high bending flexibility in the wing chord direction and high load bearing capacity and high capacity to maintain the wing shape in the wing span direction, and to which morphing aircraft technology can be applied in the high-speed regime where aerodynamic forces are high. And it is also an object of the present invention to provide an aircraft wing composite material of the wing and method of manufacture thereof.

In order to achieve the above object, the aircraft wing in accordance with a first aspect of the present invention comprises a plurality of axially long objects made from a reinforcing material having at least one direction of anisotropy, and formed so that the direction of maximum anisotropic stiffness coincides with the long axis; and an elastic material filling the gaps between the plurality of axially long objects, wherein the long axis is parallel to or substantially parallel to the span direction of the wing.

In the aircraft wing according to the first aspect of the present invention as described above, the axially long objects are oriented parallel to the wing span direction. Therefore, the stiffness of the wing in the wing span direction is determined by the stiffness of the axially long objects. The axially long objects are formed so that the maximum anisotropic stiffness is in the axial direction, so the stiffness of the wing in the wing span direction is increased due to the maximum anisotropic stiffness of the axially long objects. Also, a plurality of axially long objects is oriented parallel to the wing span direction, so the strength is also increased in the wing chord direction. Therefore, when compressive forces are acting in the wing due to the aerodynamic forces, there is no loss in load bearing capacity. Furthermore, an elastic material fills the gaps between the axially long objects, so the stiffness is reduced in the wing chord direction, which gives bending flexibility in the wing chord direction. Thus, both high bending flexibility in the wing chord direction and high capacity to maintain the wing shape in the wing span direction are achieved, and the wing can be used in the high-speed regime where aerodynamic forces are high.

In the aircraft wing according to a second aspect of the present invention, the reinforcing material is a fiber-reinforced material.

In the aircraft wing according to the second aspect of the present invention as described above, the maximum anisotropic stiffness of the fiber-reinforced material is in the axial direction. Therefore, applying this characteristic to the formation of the axially long objects allows the aircraft wing to have both high stiffness in the wing span direction and high bending flexibility in the wing chord direction.

In the aircraft wing according to a third aspect of the present invention, the plurality of axially long objects is bound sequentially and continuously in a blind shape by binding means.

In the aircraft wing according to the third aspect of the present invention as described above, by sequentially and continuously binding the axially long objects in the form of a blind by binding means, peeling of the axially long objects from the elastic material is effectively prevented. As a result, the connection between the axially long objects and elastic material is strengthened, and the fracture strength of the wing is improved.

In the aircraft wing according to a fourth aspect of the present invention, the plurality of axially long objects is oriented in a multilayer form, and the layers are bound together by binding means.

In the aircraft wing according to the fourth aspect of the present invention as described above, the axially long objects are oriented in a multilayer form, so the stiffness in the wing span direction is increased compared with that of a single layer. In addition, the strength in the wing chord direction is also increased. Also, adjacent layers are bound together by binding means, so peeling of the axially long objects from the elastic material is effectively prevented. As a result, the connection between the axially long objects and elastic material is strengthened, and the fracture strength of the wing is improved.

In the aircraft wing according to a fifth aspect of the present invention, the axially long objects and binding means form an interlocking three-dimensional woven fabric.

In the aircraft wing according to the fifth aspect of the present invention as described above, the axially long objects and binding means form an interlocking three-dimensional woven fabric. Therefore, the stiffness in the wing span direction is increased compared with that of a single layer. In addition, the strength in the wing chord direction is also increased. At the same time, peeling of the axially long objects from the elastic material is effectively prevented. As a result, the connection between the axially long objects and elastic material is strengthened, and the fracture strength of the wing is improved.

In order to achieve an object of the present invention, the aircraft wing according to a sixth aspect of the present invention comprises a wing inner plate formed in a corrugated shape made from a first reinforcing material having at least one direction of anisotropy, and formed so that the direction of maximum anisotropic stiffness is perpendicular to or substantially perpendicular to the corrugation direction; and a wing outer plate made from a second reinforcing material having at least one direction of anisotropy and formed so that the direction of maximum anisotropic stiffness coincides with that of the wing inner plate, wherein the corrugation of the wing inner plate is oriented so as to be parallel to or substantially parallel to the wing chord direction.

In the aircraft wing according to the sixth aspect of the present invention as described above, the directions of maximum anisotropic stiffness of both the wing inner plate and wing outer plate are equal together to be perpendicular to the corrugation direction. Additionally, the corrugation direction of the wing inner plate is oriented parallel to the wing chord direction. Therefore, the stiffness in the wing span direction is increased due to the maximum anisotropic stiffness of the wing inner plate and the wing outer plate. Also, the wing inner plate is formed in a corrugated shape, so the wing inner plate has elastic action. As a result, the stiffness in the wing chord direction is reduced so that the aircraft wing has bending flexibility. Accordingly, the aircraft wing is allowed to have both high bending flexibility in the wing chord direction and high capacity to maintain the wing shape in the wing span direction, and to be used in the high-speed regime where aerodynamic forces are high.

In the aircraft wing according to a seventh aspect of the present invention, the concave portion of the wing inner plate is filled with an elastic material.

In the aircraft wing according to the seventh aspect of the present invention as described above, the concave portion of the wing inner plate is filled with an elastic material, so the stiffness in the wing span direction is unchanged but due to the elastic action of the elastic material, the stiffness in the wing chord direction is reduced for the wing to have more bending flexibility. Accordingly, the aircraft wing is allowed to have both high bending flexibility in the wing chord direction and high capacity to maintain the wing shape in the wing span direction, and to be used in the high-speed regime where aerodynamic forces are high.

In the aircraft wing according to an eighth aspect of the present invention, at least one of the first reinforcing material or the second reinforcing material is a fiber-reinforced material.

In the aircraft wing according to the eighth aspect of the present invention as described above, the maximum anisotropic stiffness of the fiber-reinforced material is in the axial direction. Therefore, applying this characteristic to the formation of at least one of the wing inner plate and wing outer plate allows the aircraft wing to have both high bending flexibility in the wing chord direction and high capacity to maintain the wing shape in the wing span direction, and to be used in the high-speed regime where aerodynamic forces are high.

In the aircraft wing according to a ninth aspect of the present invention, reinforced members made from a third reinforcing material having at least one direction of anisotropy and formed so that the direction of maximum anisotropic stiffness coincides with that of the wing inner plate, are provided in the concave portions of the wing inner plate.

In the aircraft wing according to the ninth aspect of the present invention as described above, the reinforced member whose direction of maximum anisotropic stiffness is the same as that of the wing inner plate are provided in the concave portions of the wing inner plate. Therefore, the stiffness in the wing chord direction is unchanged, but in the span direction of the wing the stiffness is increased.

In the aircraft wing according to a tenth aspect of the present invention, the third reinforcing material is a fiber-reinforced material.

In the aircraft wing according to the tenth aspect of the present invention as described above, the maximum anisotropic stiffness of the fiber-reinforced material is in the axial direction. Therefore, applying this characteristic to the formation of the reinforced member allows the aircraft wing to have both high bending flexibility in the wing chord direction and high capacity to maintain the wing shape in the wing span direction, and to be used in the high-speed regime where aerodynamic forces are high.

In order to achieve an object of the present invention, the aircraft wing composite material of in accordance with an eleventh aspect of the present invention comprises a plurality of axially long objects made from a reinforcing material having at least one direction of anisotropy, and formed so that the direction of maximum anisotropic stiffness coincides with the long axis; and an elastic material filling the gaps between the plurality of axially long objects.

The aircraft wing composite material according to the eleventh aspect of the present invention as described above can be suitably used in forming the aircraft wing according to the first aspect of the present invention as described above.

In the aircraft wing composite material according to a twelfth aspect of the present invention, the reinforcing material is a fiber-reinforced material.

The aircraft wing composite material according to the twelfth aspect of the present invention as described above can be suitably used in forming the aircraft wing according to the second aspect of the present invention as described above.

In the aircraft wing composite material according to a thirteenth aspect of the present invention, the plurality of axially long objects is bound sequentially and continuously in the form of a blind by binding means.

The aircraft wing composite material according to the thirteenth aspect of the present invention as described above can be suitably used in forming the aircraft wing according to the third aspect of the present invention as described above.

In the aircraft wing composite material according to a fourteenth aspect of the present invention, the plurality of axially long objects is oriented in a multilayer form, and the layers are bound together by binding means.

The aircraft wing composite material according to the fourteenth aspect of the present invention as described above can be suitably used in forming the aircraft wing according to the fourth aspect of the present invention as described above.

In the aircraft wing composite material according to a fifteenth aspect of the present invention, the axially long objects and binding means form an interlocking three-dimensional woven fabric.

The aircraft wing composite material according to the fifteenth aspect of the present invention as described above can be suitably used in forming the aircraft wing according to the fifth aspect of the present invention as described above.

In order to achieve an object of the present invention, the aircraft wing composite material according to a sixteenth aspect of the present invention comprises an inner plate formed in a corrugated shape made from a first reinforcing material having at least one direction of anisotropy, and formed so that the direction of maximum anisotropic stiffness is perpendicular to or substantially perpendicular to the corrugation direction; and an outer plate made from a second reinforcing material having at least one direction of anisotropy and formed so that the direction of maximum anisotropic stiffness coincides with that of the inner plate.

The aircraft wing composite material according to the sixteenth aspect of the present invention as described above can be suitably used in forming the aircraft wing according to the sixth aspect of the present invention as described above.

In the aircraft wing composite material according to a seventeenth aspect of the present invention, the concave portion of the inner plate is filled with an elastic material.

The aircraft wing composite material according to the seventeenth aspect of the present invention as described above can be suitably used in forming the aircraft wing according to the seventh aspect of the present invention as described above.

In the aircraft wing composite material according to an eighteenth aspect of the present invention, at least one of the first reinforcing material or the second reinforcing material is a fiber-reinforced material.

The aircraft wing composite material according to the eighteenth aspect of the present invention as described above can be suitably used in forming the aircraft wing according to the eighth aspect of the present invention as described above.

In the aircraft wing composite material according to a nineteenth aspect of the present invention, reinforced members made from a third reinforcing material having at least one direction of anisotropy and formed so that the direction of maximum anisotropic stiffness coincides with that of the inner plate, are provided in the concave portions of the inner plate.

The aircraft wing composite material according to the nineteenth aspect of the present invention as described above can be suitably used in forming the aircraft wing according to the ninth aspect of the present invention as described above.

In the aircraft wing composite material according to a twentieth aspect of the present invention, the third reinforcing material is a fiber-reinforced material.

The aircraft wing composite material according to the twentieth aspect of the present invention as described above can be suitably used in forming the aircraft wing according to the tenth aspect of the present invention as described above.

In order to achieve an object of the present invention, the method of manufacturing an aircraft wing composite material according to a twenty-first aspect of the present invention comprises the steps of: forming a plurality of axially long objects from a reinforcing material having at least one direction of anisotropy, so that the direction of maximum anisotropic stiffness coincides with the long axis; arranging the plurality of axially long objects so as to be mutually parallel; and filling the gaps between the adjacent axially long objects with an elastic material.

The method of manufacturing an aircraft wing composite material according the twenty-first aspect of the present invention can be suitably used to manufacture the aircraft wing composite material according to the eleventh aspect of the present invention.

In the method of manufacturing an aircraft wing composite material according to a twenty-second aspect of the present invention, the reinforcing material is a fiber-reinforced material.

The method of manufacturing an aircraft wing composite material according to the twenty-second aspect of the present invention can be suitably used to manufacture the aircraft wing composite material according to the twelfth aspect of the present invention.

The method of manufacturing an aircraft wing composite material according to a twenty-third aspect of the present invention comprises the step of binding with tightness the plurality of axially long objects sequentially and continuously in the form of a blind by binding means.

The method of manufacturing an aircraft wing composite material according to the twenty-third aspect of the present invention can be suitably used to manufacture the aircraft wing composite material according to the thirteenth aspect of the present invention.

The method of manufacturing an aircraft wing composite material according to a twenty-fourth aspect of the present invention comprises the steps of arranging the plurality of axially long objects mutually parallel in a multilayer form, and binding with tightness the adjacent layers by binding means.

The method of manufacturing an aircraft wing composite material according to the twenty-fourth aspect of the present invention can be suitably used to manufacture the aircraft wing composite material according to the fourteenth aspect of the present invention.

The method of manufacturing an aircraft wing composite according to a twenty-fifth aspect of the present invention comprises the steps of arranging the plurality of axially long objects mutually parallel and forming an interlocking three-dimensional woven fabric by binding together with the binding means.

The method of manufacturing an aircraft wing composite according to the twenty-fifth aspect of the present invention can be suitably used to manufacture the aircraft wing composite material according to the fifteenth aspect of the present invention.

In order to achieve an object of the present invention, the method of manufacturing an aircraft wing composite material according to a twenty-sixth aspect of the present invention comprises the steps of: forming a corrugated plate by molding a first reinforcing material having at least one direction of anisotropy in a corrugated shape, so that the direction of maximum anisotropic stiffness is perpendicular to or substantially perpendicular to the corrugation direction; forming a plane plate by molding a second reinforcing material having at least one direction of anisotropy in a planar shape; and joining the corrugated plate to the plane plate so that the direction of maximum anisotropic stiffness of the corrugated plate coincides with that of the plane plate.

The method of manufacturing an aircraft wing composite material according to the twenty-sixth aspect of the present invention can be suitably used to manufacture the aircraft wing composite material according to the sixteenth aspect of the present invention.

The method of manufacturing an aircraft wing composite material according to a twenty-seventh aspect of the present invention comprises the step of filling the concave portions of the corrugated plate with an elastic material.

The method of manufacturing an aircraft wing composite according to the twenty-seventh aspect of the present invention can be suitably used to manufacture the aircraft wing composite material according to the seventeenth aspect of the present invention.

In the method of manufacturing an aircraft wing composite material according to a twenty-eighth aspect of the present invention, at least one of the first reinforcing material or the second reinforcing material is a fiber-reinforced material.

The method of manufacturing an aircraft wing composite material according to the twenty-eighth aspect of the present invention can be suitably used to manufacture the aircraft wing composite material according to the eighteenth aspect of the present invention.

The method of manufacturing an aircraft wing composite material according to a twenty-ninth aspect of the present invention further comprises the steps of: forming a reinforced member from a third reinforcing material having at least one direction of anisotropy so that the direction of maximum anisotropic stiffness coincides with that of the corrugated plate; and providing the reinforced member in the concave portion of the corrugated plate.

The method of manufacturing an aircraft wing composite material according to the twenty-ninth aspect of the present invention can be suitably used to manufacture the aircraft wing composite material according to the nineteenth aspect of the present invention.

In the method of manufacturing an aircraft wing composite material according to a thirtieth aspect of the present invention, the third reinforcing material is a fiber-reinforced material.

The method of manufacturing an aircraft wing composite material according to the thirtieth aspect of the present invention can be suitably used to manufacture the aircraft wing composite material according to the twentieth aspect of the present invention.

Thus, the aircraft wing of the present invention is allowed to have both high bending flexibility in the wing chord direction and high capacity to maintain the wing shape in the wing span direction, and to be applied for morphing aircraft technology in the high-speed regime where aerodynamic forces are high. Also, the aircraft wing according to the present invention can be suitably formed with the aircraft wing composite material according to the present invention. Furthermore, the aircraft wing composite material according to the present invention can be suitably manufactured by the manufacturing method of an aircraft wing composite material according to the present invention.

DESCRIPTION OF THE PREFERRED EMBODIMENTS

Figure 1:
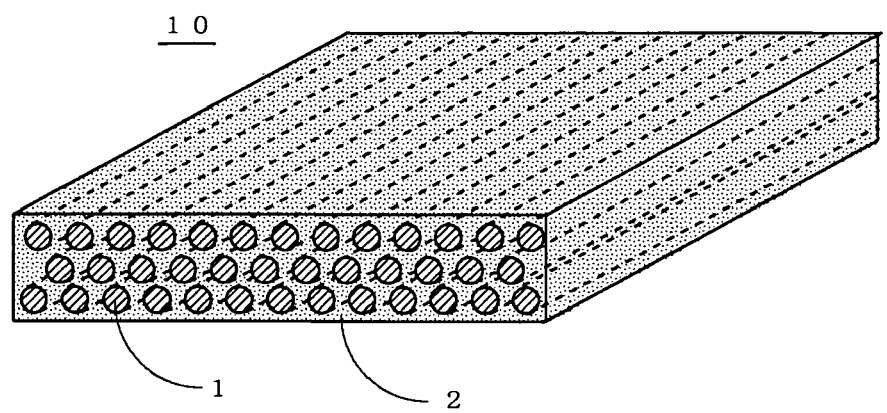
FIG. 1 is a perspective view showing the cross-section of the main portion of the composite material for an aircraft wing according to a first embodiment of the present invention.

The preferred embodiments of the present invention will be described below in detail, referring to the drawings. However, it is understood that the present invention is not limited to these embodiments.

First Embodiment

FIG. 1 is a perspective view showing the cross-section of the main portion of an aircraft wing composite material 10 according to a first embodiment of the present invention.

This aircraft wing composite material 10 comprises carbon fiber-reinforced plastic (hereafter referred to as CFRP) rods 1 made from CFRP material with the anisotropic stiffness in the axial direction, and an elastic material 2 filling the gaps between the CFRP rods 1.

This aircraft wing composite material 10 is obtained by the manufacturing method where the CFRP rods 1 are firstly made by arranging the carbon fibers in axial direction and then, the CFRP rods 1 are laid in the same direction and then, the gaps between the CFRP rods 1 are impregnated with the precursor of the elastic material 2 and hardened. The elastic material 2 is a silicone rubber, for example.

Figure 2:
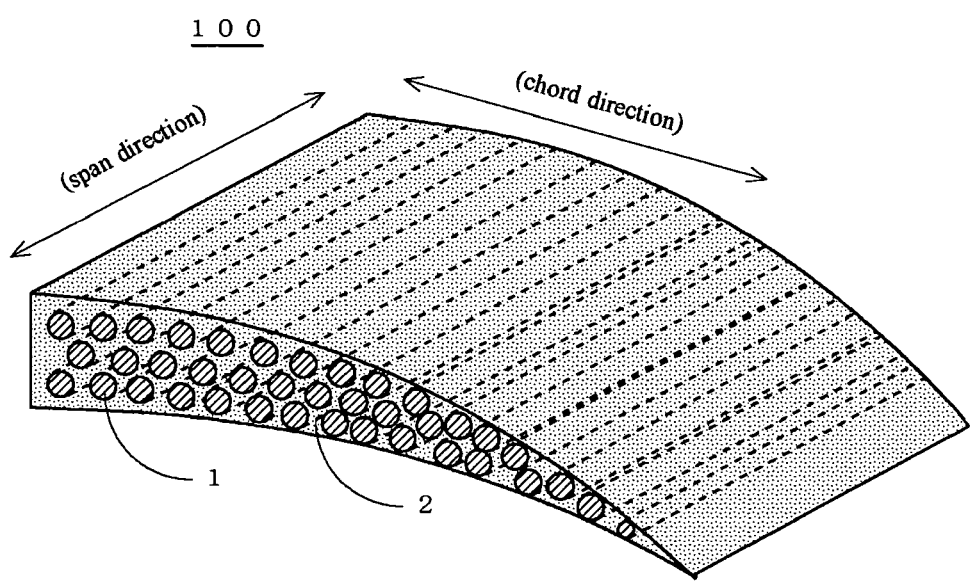
FIG. 2 is a perspective view showing the cross-section of the main portion of the aircraft wing according to a first embodiment of the present invention.

FIG. 2 is a perspective view showing the cross-section of the main portion of an aircraft wing 100 according to a first embodiment of the present invention.

This aircraft wing 100 is formed from the above aircraft wing composite material 10 with the axial direction of the CFRP rods 1 arranged parallel to the wing span direction.

As the result, the aircraft wing 100 permits the wing stiffness in the wing span direction to be increased since the stiff anisotropic direction of the CFRP rods 1 is parallel to the wing span direction. Additionally, the aircraft wing 100 also permits the bending flexibility of the wing in the chord direction to be increased due to the elastic material 2 filling the gaps between the CFRP rods 1. Therefore, the aircraft wing 100 can have both high bending flexibility in the wing chord direction and high capacity to maintain the wing shape in the wing span direction. Also, the aircraft wing 100 can be applied to the morphing aircraft technology in the high-speed regimes where the aerodynamic forces are high as the strength is increased in the wing chord direction due to the plurality of CFRP rods 1.

Second Embodiment

Figure 3:
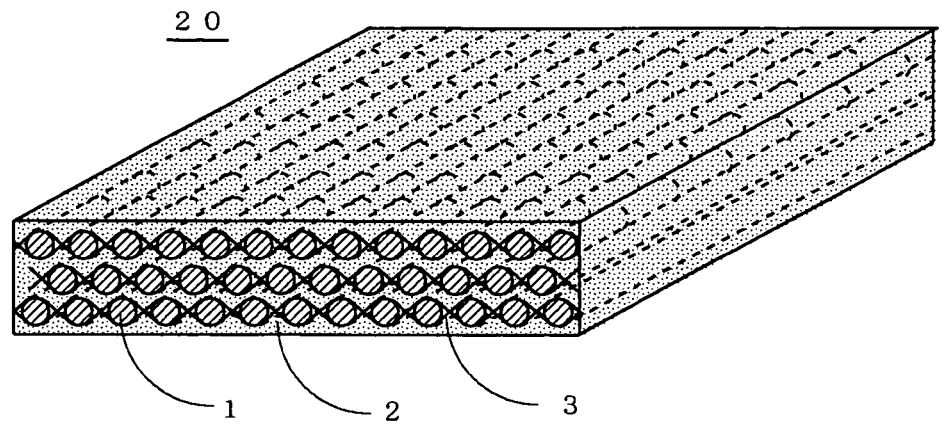
FIG. 3 is a perspective view showing the cross-section of the main portion of the composite material for an aircraft wing according to a second embodiment of the present invention.

FIG. 3 is a perspective view showing the cross-section of the main portion of an aircraft wing composite material 20 according to a second embodiment of the present invention.

This aircraft wing composite material 20 comprises CFRP rods 1 with the anisotropic stiffness in the axial direction, an elastic material 2 filling the gaps between the CFRP rods 1, and yarn 3 binding the CFRP rods 1. The elastic material 2 is a silicone rubber, for example, and the yarn 3 is spun aramide fiber, for example.

This aircraft wing composite material 20 is obtained by the manufacturing method where the CFRP rods 1 are firstly made by arranging the carbon fibers in axial direction and then, the CFRP rods 1 are laid in the same direction and then, the CFRP rods 1 are constructed into the form of a blind using the yarn 3 and then, the CFRP rods 1 constructed into the form of a blind are piled in a plurality of layers and then, the gaps between the CFRP rods 1 are impregnated with the precursor of the elastic material 2 and hardened.

Figure 4:
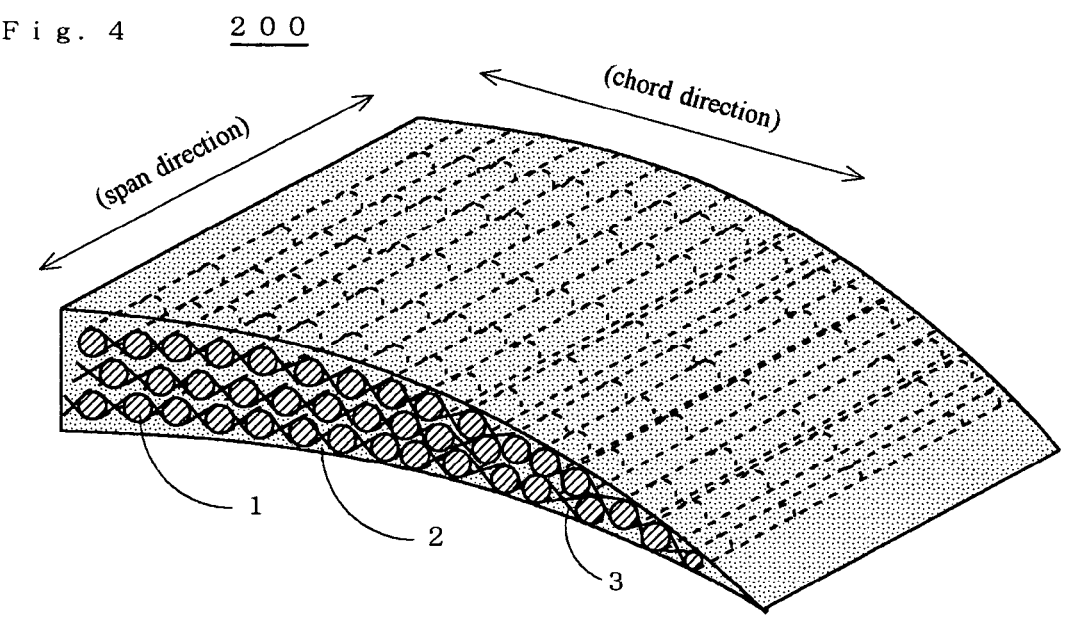
FIG. 4 is a perspective view showing the cross-section of the main portion of the aircraft wing according to a second embodiment of the present invention.

FIG. 4 is a perspective view showing the cross-section of the main portion of an aircraft wing 200 according to a second embodiment of the present invention.

This aircraft wing 200 is formed from the above aircraft wing composite material 20 with the axial direction of the CFRP rods 1 arranged parallel to the wing span direction.

Thus, the aircraft wing 200 permits the wing stiffness in the wing span direction to be increased since the stiff anisotropic direction of the CFRP rods 1 is parallel to the wing span direction. Additionally, the aircraft wing 200 also permits the bending flexibility of the wing in the chord direction to be increased due to the elastic material 2 filling the gaps between the CFRP rods 1. Therefore, the aircraft wing 200 can have both high bending flexibility in the wing chord direction and high capacity to maintain the wing shape in the wing span direction. Also, the aircraft wing 200 can be applied to the morphing aircraft technology in the high-speed regime where the aerodynamic forces are high as the strength is increased in the wing chord direction due to the plurality of CFRP rods 1. Furthermore, the CFRP rods 1 are bound into the form of a blind with yarn 3, so peeling of the CFRP rods 1 from the elastic material 2 is suitably prevented, which improves the fracture strength of the wing.

Third Embodiment

Figure 5:
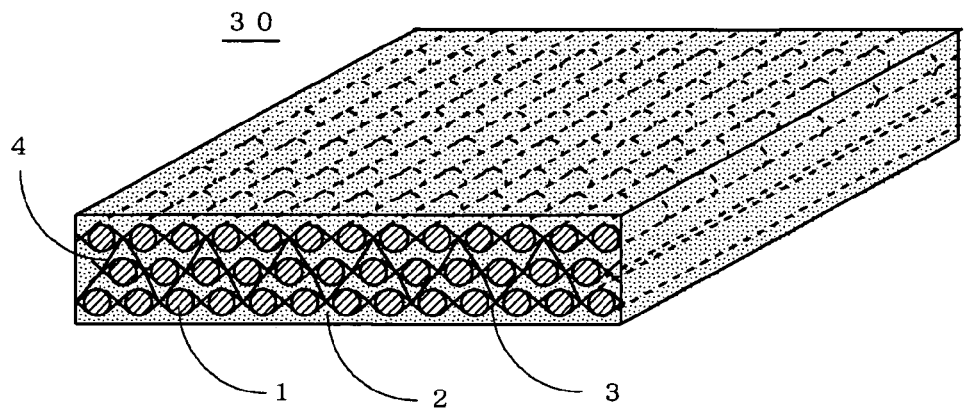
FIG. 5 is a perspective view showing the cross-section of the main portion of the composite material for an aircraft wing according to a third embodiment of the present invention.

FIG. 5 is a perspective view showing the cross-section of the main portion of an aircraft wing composite material 30 according to a third embodiment of the present invention.

This aircraft wing composite material 30 comprises CFRP rods 1 with the anisotropic stiffness in the axial direction, an elastic material 2 filling the gaps between the CFRP rods 1, yarn 3 binding the CFRP rods 1 in the form of a blind, and binding yarn 4 for binding together the yarn 3.

This aircraft wing composite material 30 is obtained by the manufacturing method where the CFRP rods 1 are firstly made by arranging the carbon fibers in axial direction and then, the CFRP rods 1 are laid in the same direction and then, the CFRP rods 1 are constructed into the form of a blind using the yarn 3 and then, the CFRP rods 1 constructed into the form of a blind are piled in a plurality of layers and then, the yarn 3 is bound with the binding yarn 4 together and then, the gaps between the CFRP rods 1 are impregnated with the precursor of the elastic material 2 and hardened. The elastic material 2 is a silicone rubber, for example, the yarn 3 is spun carbon fiber, for example, and the binding yarn 4 is spun aramide fiber, for example.

Figure 6:
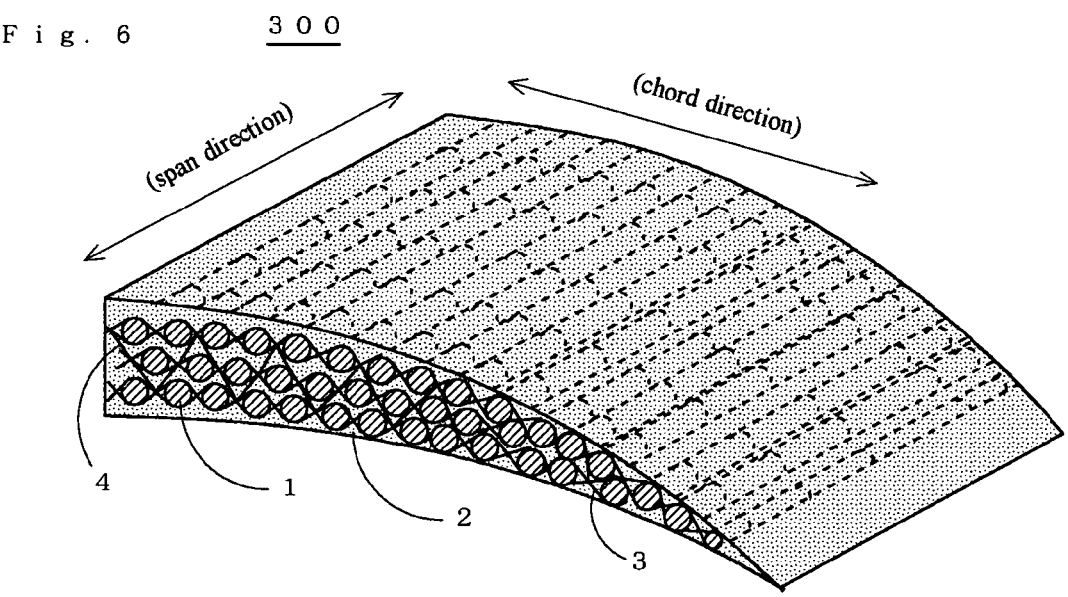
FIG. 6 is a perspective view showing the cross-section of the main portion of the aircraft wing according to a third embodiment of the present invention.

FIG. 6 is a perspective view showing the cross-section of the main portion of an aircraft wing 300 according to a third embodiment of the present invention.

This aircraft wing 300 is formed from the above aircraft wing composite material 30 with the axial direction of the CFRP rods 1 arranged parallel to the wing span direction.

Thus, the aircraft wing 300 permits the wing stiffness in the wing span direction to be increased since the stiff anisotropic direction of the CFRP rods 1 is parallel to the wing span direction. Additionally, the aircraft wing 300 also the bending flexibility of the wing in the wing chord direction to be increased due to the elastic material 2 filling the gaps between the CFRP rods 1. Therefore, the aircraft wing 300 can have both high bending flexibility in the wing chord direction and high capacity to maintain the wing shape in the wing span direction. Also, the aircraft wing 300 can be applied to morphing aircraft technology in the high-speed regime where the aerodynamic forces are high as the strength is increased in the wing chord direction due to the plurality of CFRP rods 1. Furthermore, the CFRP rods 1 are bound in the form of a blind with yarn 3, and the CFRP rods 1 are formed in a plurality of layers with the layers connected together by the binding yarn 4, so peeling of the CFRP rods 1 from the elastic material 2 is suitably prevented, which improves the fracture strength of the wing.

Fourth Embodiment

Figure 7:
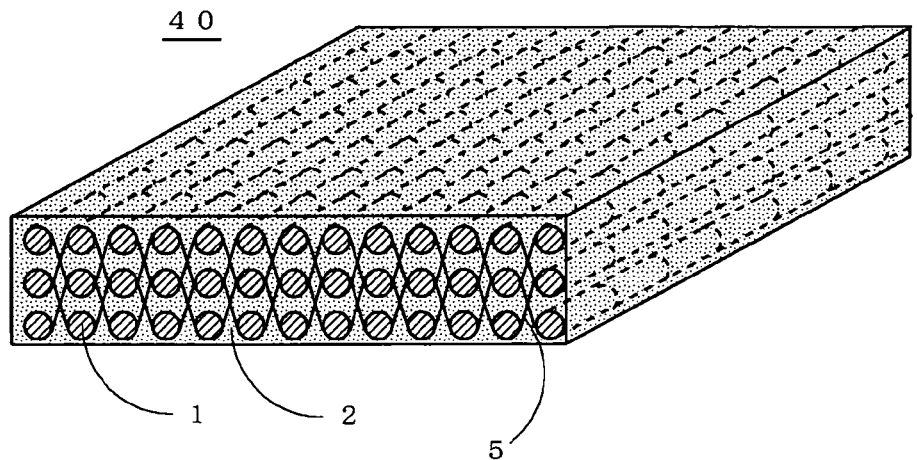
FIG. 7 is a perspective view showing the cross-section of the main portion of the composite material for an aircraft wing according to a fourth embodiment of the present invention.

FIG. 7 is a perspective view showing the cross-section of the main portion of an aircraft wing composite material 40 according to a fourth embodiment of the present invention.

This aircraft wing composite material 40 comprises CFRP rods made of CFRP, an elastic material 2 filling the gaps between the CFRP rods 1, and interlocking yarn 5 forming a three-dimensional woven fabric together with the CFRP rods 1. The elastic material 2 is a silicone rubber, for example, and the interlocking yarn 5 is a carbon fiber yarn, for example.

This aircraft wing composite material 40 is obtained by the manufacturing method where the CFRP rods 1 are firstly made by arranging the carbon fibers in axial direction and then, the CFRP rods 1 and the interlocking yarn 5 are woven into a three-dimensional woven fabric shape with the CFRP rods 1 considered to be yarn in one direction and then, the gaps between the CFRP rods 1 are impregnated with the precursor of the elastic material 2 and hardened.

Figure 8:
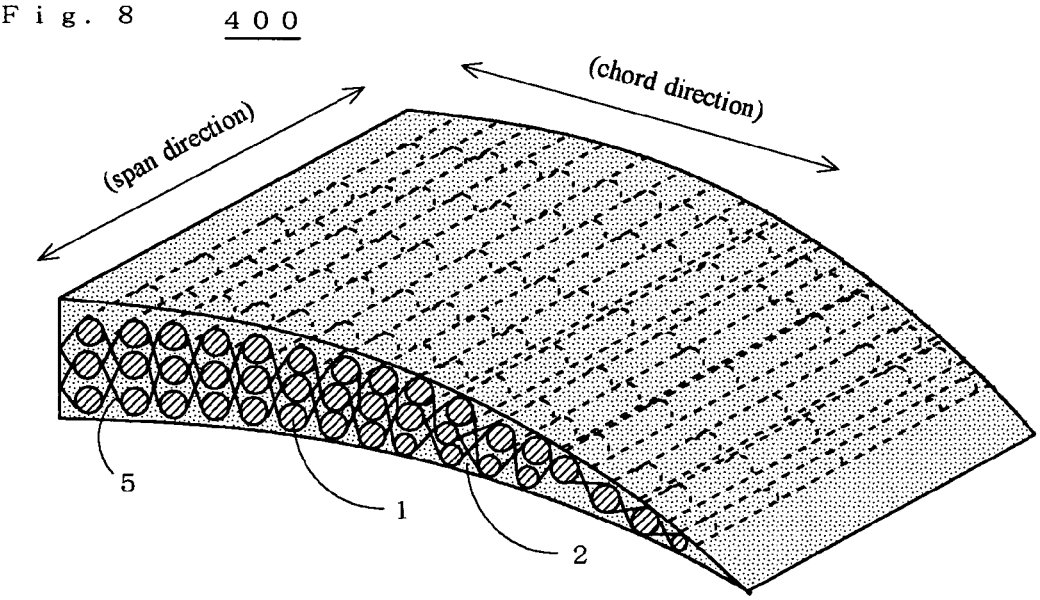
FIG. 8 is a perspective view showing the cross-section of the main portion of the aircraft wing according to a fourth embodiment of the present invention.

FIG. 8 is a perspective view showing the cross-section of the main portion of an aircraft wing 400 according to a fourth embodiment of the present invention.

This aircraft wing 400 is formed from the above aircraft wing composite material 40 with the axial direction of the CFRP rods 1 arranged parallel to the wing span direction.

Thus, the aircraft wing 400 permits the wing stiffness in the wing span direction to be increased since the stiff anisotropic direction of the CFRP rods 1 is parallel to the wing span direction. Additionally, the aircraft wing 400 also permits the bending flexibility of the wing in the chord direction to be increased due to the elastic material 2 filling the gaps between the CFRP rods 1. Furthermore, the CFRP rods 1 and the interlocking yarn 5 are woven and bound into a three-dimensional fabric, so peeling of the CFRP rods 1 from the elastic material 2 is prevented. Therefore, the aircraft wing 400 can have not only both high bending flexibility in the wing chord direction and high capacity to maintain the wing shape in the wing span direction, but also high fracture strength. As a result, morphing aircraft technology can be applied to the wing in the high-speed regime where the aerodynamic forces are high.

Fifth Embodiment

Figure 9:
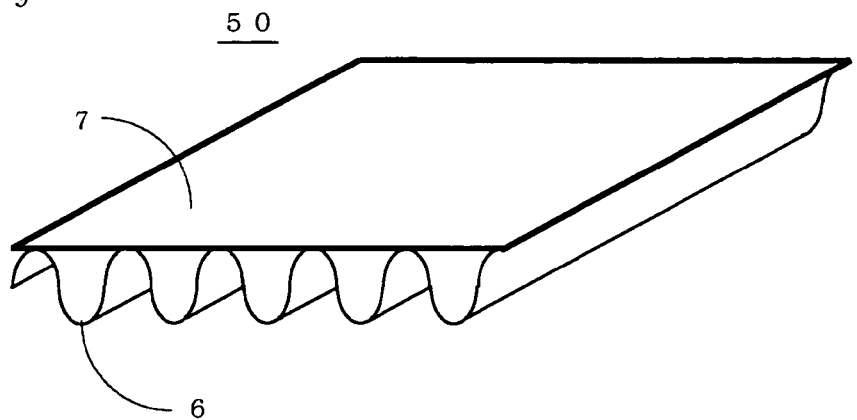
FIG. 9 is a perspective view showing the cross-section of the main portion of the composite material for an aircraft wing according to a fifth embodiment of the present invention.

FIG. 9 is a perspective view showing the cross-section of the main portion of an aircraft wing composite material 50 according to a fifth embodiment of the present invention.

This aircraft wing composite material 50 comprises a corrugated CFRP plate 6 formed in a corrugated shape with CFRP, and a thin CFRP plate 7 formed in a planar shape with CFRP.

This aircraft wing composite material 50 is obtained by the manufacturing method where the corrugated CFRP plate 6 is firstly made by placing carbon fiber woven fabric or similar reinforcing material in a corrugated mold with the anisotropic stiff direction perpendicular to the corrugation direction and then, the fabric is impregnated by injecting plastic resin and hardening the plastic resin and then, the thin CFRP plate 7 is bound to the surface of the corrugated CFRP plate 6 with an adhesive so that the anisotropic stiff direction of the thin CFRP plate 7 is the same as that of the corrugated CFRP plate 6.

Figure 10:
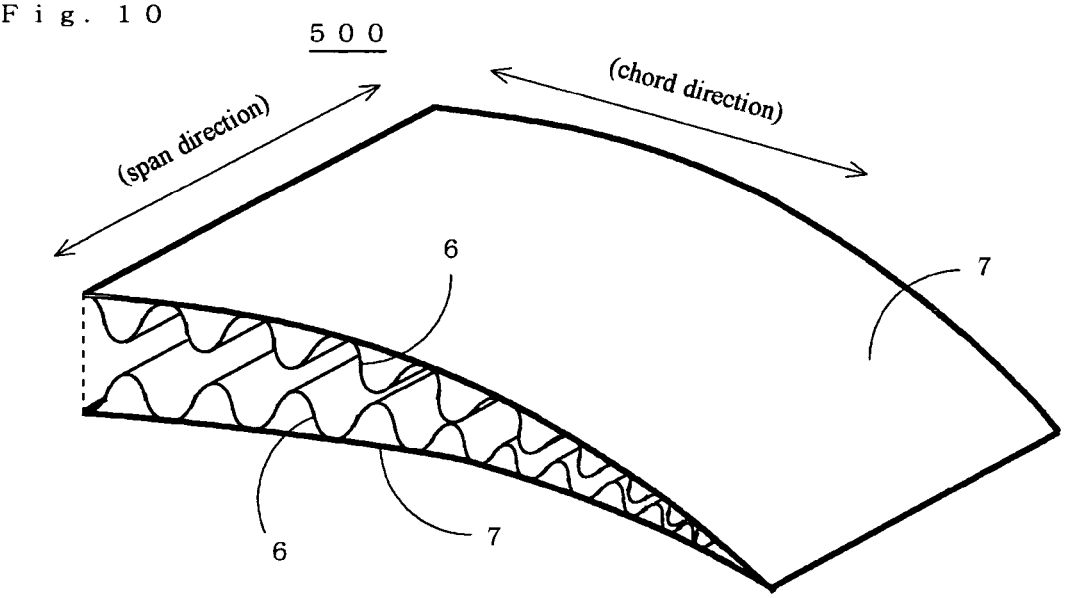
FIG. 10 is a perspective view showing the cross-section of the main portion of the aircraft wing according to a fifth embodiment of the present invention.

FIG. 10 is a perspective view showing the cross-section of the main portion of an aircraft wing 500 according to a fifth embodiment of the present invention.

This aircraft wing 500 is made from the above aircraft wing composite material 50 so that the stiff anisotropic direction of the corrugated CFRP plate 6 and thin CFRP plate 7 is parallel to the wing span direction.

Thus, the aircraft wing 500 permits the wing stiffness in the wing span direction to be increased since the stiff anisotropic direction of the corrugated CFRP plate 6 is parallel to the wing span direction. Additionally, the aircraft wing 500 also permits the bending flexibility of the wing in the chord direction and the compressive strength of the wing to be increased due to the elastic action of the corrugated CFRP plate 6. Therefore, the aircraft wing 500 can have both high bending flexibility in the wing chord direction and high capacity to maintain the wing shape in the wing span direction. As the result, morphing aircraft technology can be applied to the wing in the high-speed regime where the aerodynamic forces are high.

Sixth Embodiment

Figure 11:
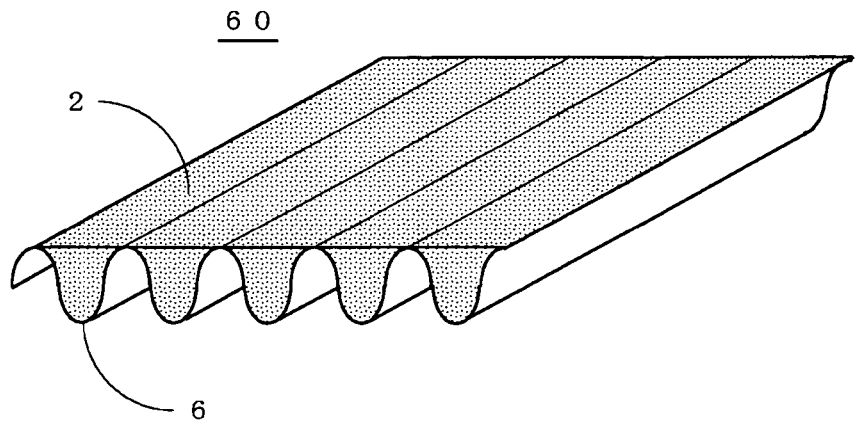
FIG. 11 is a perspective view showing the cross-section of the main portion of the composite material for an aircraft wing according to a sixth embodiment of the present invention.

FIG. 11 is a perspective view showing the cross-section of the main portion of an aircraft wing composite material 60 according to a sixth embodiment of the present invention.

This aircraft wing composite material 60 comprises a corrugated CFRP plate 6 formed in a corrugated shape with CFRP, and an elastic material 2 filling the concave portion (valley portion) of the surface thereof to form a smooth plane surface. The elastic material 2 is a silicone rubber, for example.

This aircraft wing composite material 60 is obtained by the manufacturing method where the corrugated CFRP plate 6 is firstly made by placing carbon fiber woven fabric or similar reinforcing material in a corrugated mold with the anisotropic stiff direction perpendicular to the corrugation direction and then, the fabric is impregnated by injecting polymer and then, the elastic material 2 is impregnated in the concave portion (valley portion) of the surface of the corrugated CFRP plate 6, and hardened there.

Figure 12:
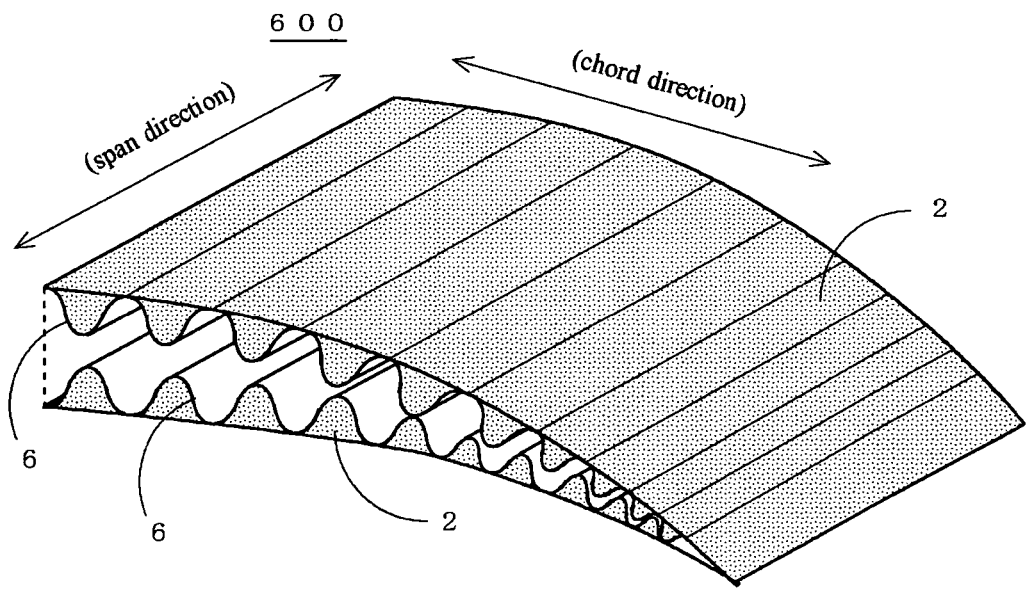
FIG. 12 is a perspective view showing the cross-section of the main portion of the aircraft wing according to a sixth embodiment of the present invention.

FIG. 12 is a perspective view showing the cross-section of the main portion of an aircraft wing 600 according to a sixth embodiment of the present invention.

This aircraft wing 600 is made from the above aircraft wing composite material 60 so that the stiff anisotropic direction of the corrugated CFRP plate 6 is parallel to the wing span direction.

Thus, the aircraft wing 600 permits the wing stiffness in the wing span direction to be increased since the stiff anisotropic direction of the corrugated CFRP plate 6 is parallel to the wing span direction. Additionally, the aircraft wing 600 also permits the bending flexibility of the wing in the chord direction and the compressive strength of the wing to be increased due to the elastic action of the corrugated CFRP plate 6 and the elastic material 2. In particular, the compressive strength of the wing is large, so the range of movement of the wing is increased.

Seventh Embodiment

Figure 13:
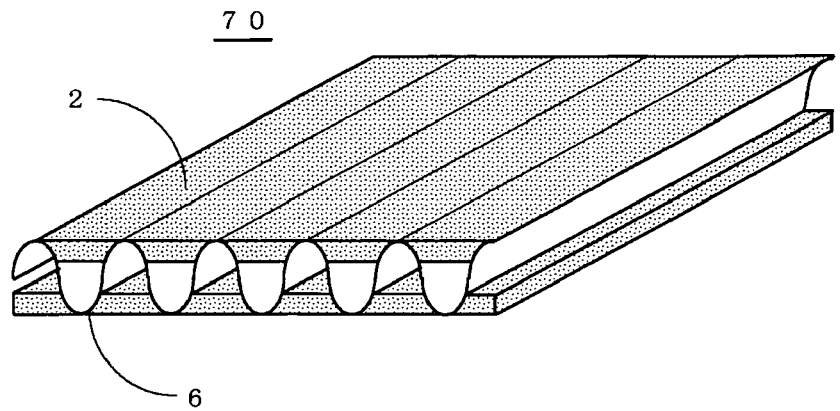
FIG. 13 is a perspective view showing the cross-section of the main portion of the composite material for an aircraft wing according to a seventh embodiment of the present invention.

FIG. 13 is a perspective view showing the cross-section of the main portion of an aircraft wing composite material 70 according to a seventh embodiment of the present invention.

This aircraft wing composite material 70 comprises a corrugated CFRP plate 6 formed in a corrugated shape with CFRP, and an elastic material 2 forming a smooth plane surface as well as forming voids on concave portions (valley portions) of the front surface and rear surface. The elastic material 2 is a synthetic rubber, for example.

This aircraft wing composite material 70 is obtained by the manufacturing method where the corrugated CFRP plate 6 is firstly made by placing carbon fiber woven fabric or similar reinforcing material in a corrugated mold with the anisotropic stiff direction perpendicular to the corrugation direction and then, the fabric is impregnated by injecting polymer and then, the precursor of the elastic material 2 is impregnated on the top of the concave portion (valley portion) of the front surface and rear surface of the corrugated CFRP plate 6 while enclosing air in the deep part of the concave portion (valley portion), and hardened.

Figure 14:
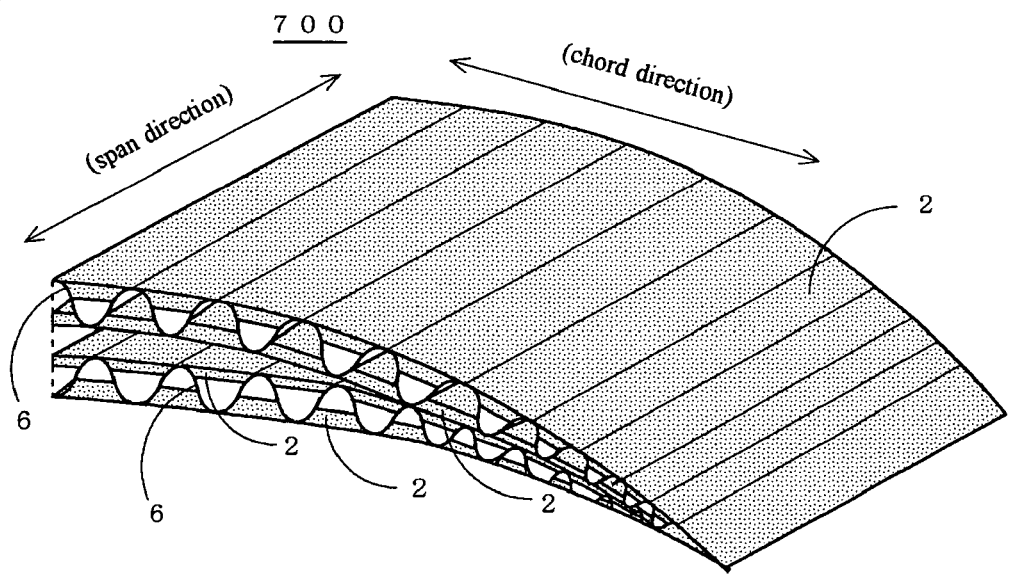
FIG. 14 is a perspective view showing the cross-section of the main portion of the aircraft wing according to a seventh embodiment of the present invention.

FIG. 14 is a perspective view showing the cross-section of the main portion of an aircraft wing 700 according to a seventh embodiment of the present invention.

This aircraft wing 700 is made from the above aircraft wing composite material 70 so that the stiff anisotropic direction of the corrugated CFRP plate 6 is parallel to the wing span direction.

Thus, the aircraft wing 700 permits the wing stiffness in the wing span direction to be increased since the stiff anisotropic direction of the corrugated CFRP plate 6 is parallel to the wing span direction. Additionally, the aircraft wing 700 also permits not only the bending flexibility of the wing in the chord direction but also the compressive strength of the wing to be increased due to the elastic action of the corrugated CFRP plate 6 and the elastic material 2 and the compressibility of the enclosed air. In particular, the range of movement of the wing is increased due to the increase of compressive strength.

Eighth Embodiment

Figure 15:
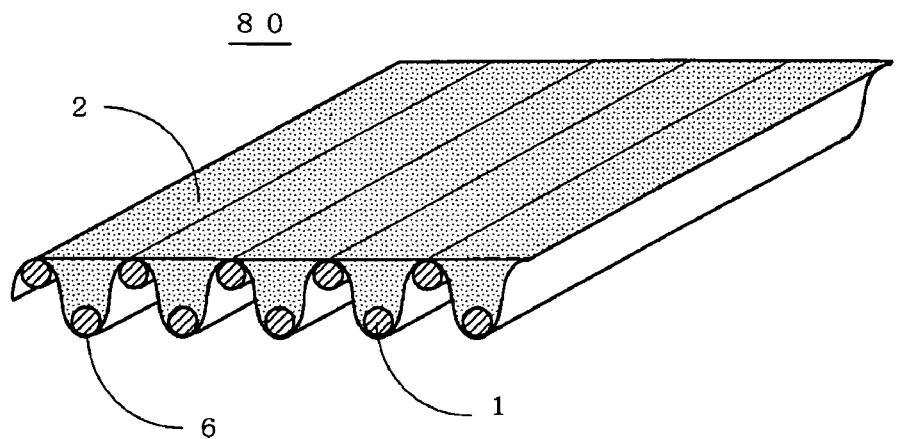
FIG. 15 is a perspective view showing the cross-section of the main portion of the composite material for an aircraft wing according to an eighth embodiment of the present invention.

FIG. 15 is a perspective view showing the cross-section of the main portion of an aircraft wing composite material 80 according to an eighth embodiment of the present invention.

This aircraft wing composite material 80 comprises a corrugated CFRP plate 6 formed in a corrugated shape with CFRP, CFRP rods 1 arranged in the concave portions (valley portions) of the front and rear faces, and an elastic material 2 filling the concave portion (valley portion) of the front face. The elastic material 2 is a silicone rubber, for example.

This aircraft wing composite material 80 is obtained by the manufacturing method where the corrugated CFRP plate 6 is firstly made by placing carbon fiber woven fabric or similar reinforcing material in a corrugated mold with the stiff anisotropic direction perpendicular to the corrugation direction and then, the fabric is impregnated by injecting polymer and then, CFRP rods 1 are made with the carbon fibers oriented along the axial direction of the rods and then, the CFRP rods 1 are arranged in the concave portions (valley portions) of the front and rear faces of the corrugated CFRP plate 6 and then, the precursors of the elastic material 2 are placed in the concave portions (valley portions) of the front surface of the corrugated CFRP plate 6 and hardened.

Figure 16:
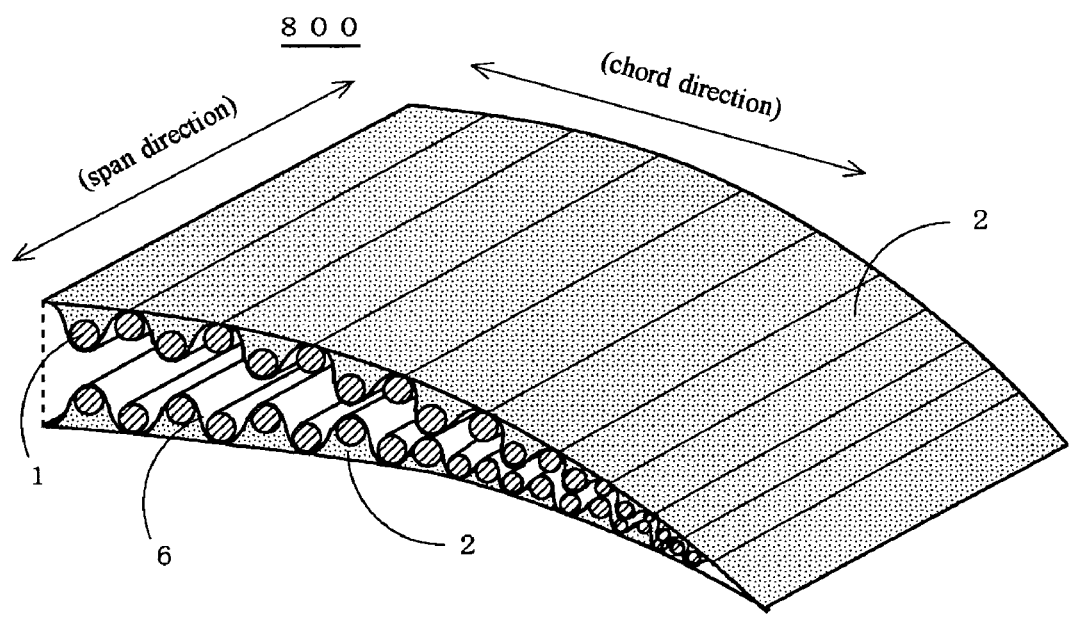
FIG. 16 is a perspective view showing the cross-section of the main portion of the aircraft wing according to an eighth embodiment of the present invention.

FIG. 16 is a perspective view showing the cross-section of the main portion of an aircraft wing 800 according to an eighth embodiment of the present invention.

This aircraft wing 800 is made from the above aircraft wing composite material 80 so that the stiff anisotropic direction of the corrugated CFRP plate 6 is parallel to the wing span direction.

Thus, the aircraft wing 800 permits the wing stiffness in the wing span direction to be increased since the stiff anisotropic directions of the corrugated CFRP plate 6 and the CFRP rods 1 are parallel to the wing span direction. Additionally, the aircraft wing 800 permits the bending flexibility of the wing in the chord direction to be increased due to the elastic action of the corrugated CFRP plate 6 and the elastic material 2.

Ninth Embodiment

Figure 17:
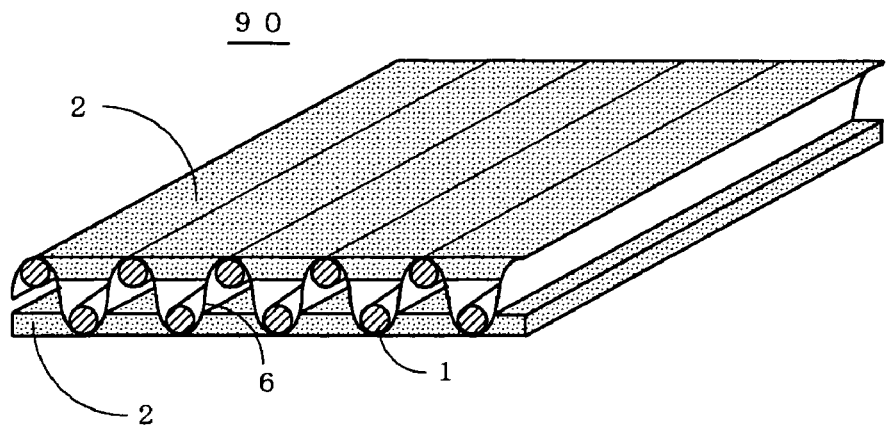
FIG. 17 is a perspective view showing the cross-section of the main portion of the composite material for an aircraft wing according to a ninth embodiment of the present invention.

FIG. 17 is a perspective view showing the cross-section of the main portion of an aircraft wing composite material 90 according to a ninth embodiment of the present invention.

This aircraft wing composite material 90 comprises a corrugated CFRP plate 6 formed in a corrugated shape with CFRP, CFRP rods 1 arranged in the concave portions (valley portions) of the front and rear faces, and an elastic material 2 forming a smooth plane surface on concave portions (valley portions) of the front surface and rear surface as well as forming voids. The elastic material 2 is a synthetic rubber, for example.

This aircraft wing composite material 90 is obtained by the manufacturing method where the corrugated CFRP plate 6 is firstly made by placing carbon fiber woven fabric or similar reinforcing material in a corrugated mold with the stiff anisotropic direction perpendicular to the corrugation direction and then, the fabric is impregnated by injecting polymer and then, CFRP rods 1 are made with the carbon fibers oriented along the axial direction of the rods and then, the CFRP rods 1 are arranged in the concave portions (valley portions) of the front and rear faces of the corrugated CFRP plate 6 and then, the precursor of the elastic material 2 is placed in the top of the concave portion (valley portion) of the front and rear surfaces of the corrugated CFRP plate 6 so that the air is enclosed in the deep part of the concave portion (valley portion) and so that the surface of the corrugated CFRP 6 are smooth, and hardened.

Figure 18:
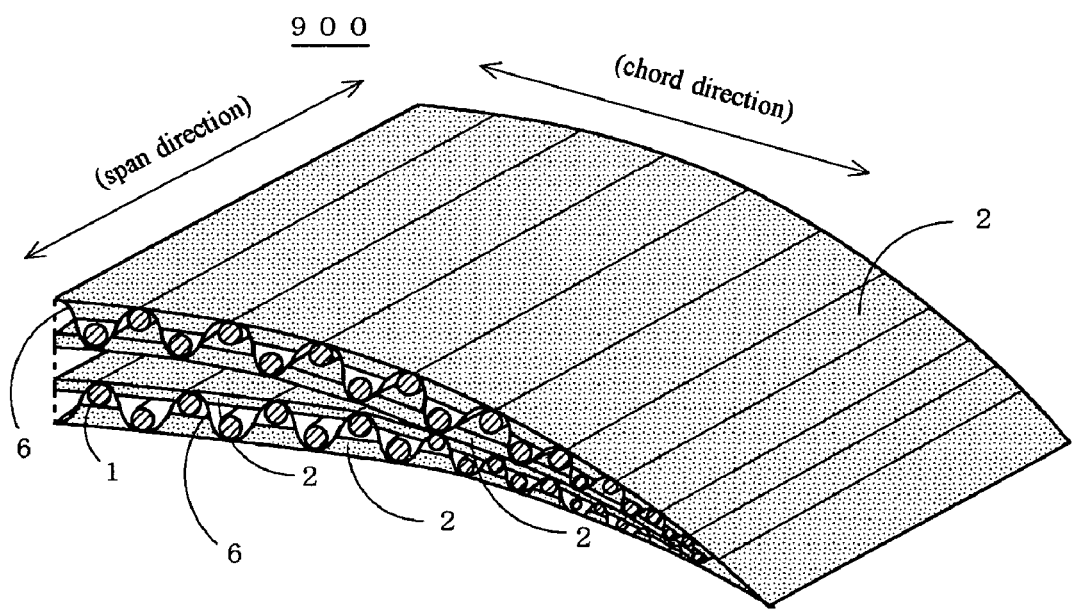
FIG. 18 is a perspective view showing the cross-section of the main portion of the aircraft wing according to a ninth embodiment of the present invention.

FIG. 18 is a perspective view showing the cross-section of the main portion of an aircraft wing 900 according to a ninth embodiment of the present invention.

This aircraft wing 900 is made from the above aircraft wing composite material 90 so that the stiff anisotropic directions of the corrugated CFRP plate 6 are parallel to the wing span direction.

Thus, the aircraft wing 900 permits the wing stiffness in the wing span direction to be increased since the stiff anisotropic directions of the corrugated CFRP plate 6 and the CFRP rods 1 are parallel to the wing span direction. Additionally, the aircraft wing 900 permits not only the bending flexibility of the wing in the chord direction but also the compressive strength of the wing to be increased due to the both elastic material 2 and the compressibility of the enclosed air.

Tenth Embodiment

Figure 19:
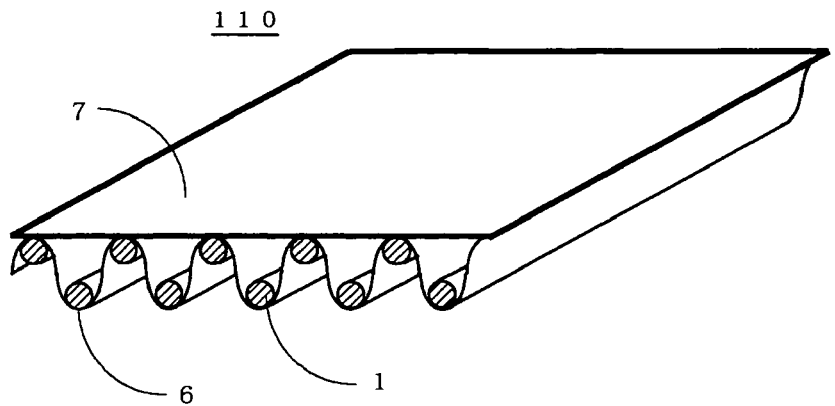
FIG. 19 is a perspective view showing the cross-section of the main portion of the composite material for an aircraft wing according to a tenth embodiment of the present invention.

FIG. 19 is a perspective view showing the cross-section of the main portion of an aircraft wing composite material 110 according to a tenth embodiment of the present invention.

This aircraft wing composite material 110 comprises a corrugated CFRP plate 6 formed in a corrugated shape with CFRP, CFRP rods 1 arranged in the concave portions (valley portions) of the front and rear faces of the corrugated CFRP plate 6, and a thin CFRP plate 7 forming a smooth plane surface on the front surface.

This aircraft wing composite material 110 is obtained by the manufacturing method where the corrugated CFRP plate 6 is firstly made by placing carbon fiber woven fabric or similar reinforcing material in a corrugated mold with the stiff anisotropic direction perpendicular to the corrugation direction and then, the fabric is impregnated by injecting polymer and then, CFRP rods 1 are made with the carbon fibers oriented along the axial direction of the rods and then, the CFRP rods 1 are arranged in the concave portions (valley portions) of the front and rear faces of the corrugated CFRP plate 6 and then, the thin CFRP plate 7 is attached to the front surface of the corrugated CFRP plate 6 with adhesive so that the stiff anisotropic direction of the thin CFRP plate 7 is the same as that of the corrugated CFRP plate 6.

Figure 20:
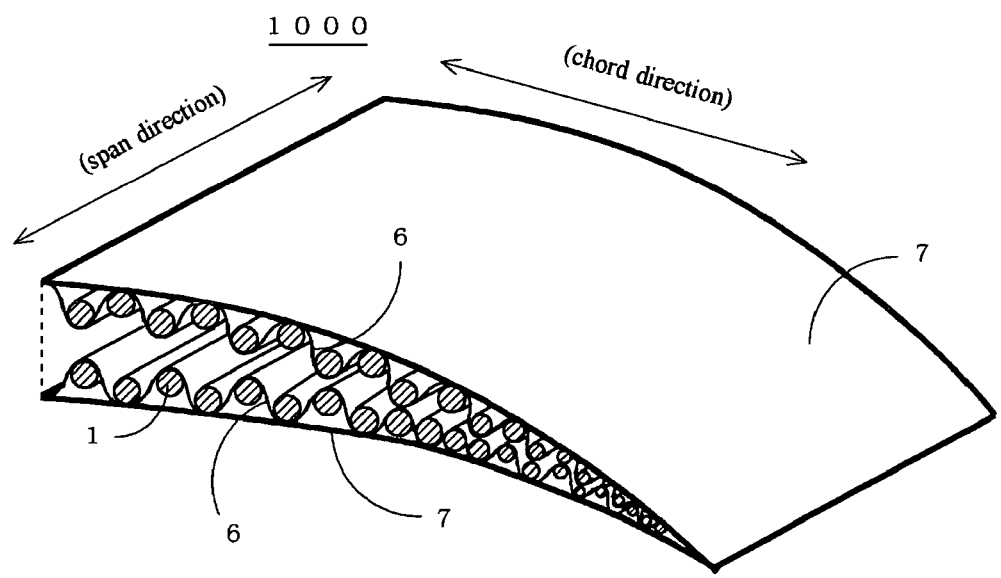
FIG. 20 is a perspective view showing the cross-section of the main portion of the aircraft wing according to a tenth embodiment of the present invention.

FIG. 20 is a perspective view showing the cross-section of the main portion of an aircraft wing 1000 according to a tenth embodiment of the present invention.

This aircraft wing 1000 is made from the above aircraft wing composite material 110 so that the stiff anisotropic direction of the corrugated CFRP plate 6, the CFRP rods 1, and the thin CFRP plate 7 is parallel to the wing span direction.

Thus, the aircraft wing 1000 permits the wing stiffness in the wing span direction to be increased since the stiff anisotropic directions of the corrugated CFRP plate 6, CFRP rods 1 and thin CFRP plate 7 are parallel to the wing span direction. Additionally, the aircraft wing 1000 also permits not only the bending flexibility of the wing in the chord direction but also the compressive strength of the wing to be increased due to the elastic action of the corrugated CFRP plate 6.

Eleventh Embodiment

In the above eighth to tenth embodiments, instead of CFRP rods 1, CFRP square bars may be used.

Twelfth Embodiment

It is not necessary that all parts of the aircraft wing be comprised of the aircraft wing composite material of the above inventions. That is, the aircraft wing composite material described above may be applied to a part of the all wing where the bending flexibility in the wing chord direction is required (for example, the trailing edge part of the wing). Also, adjusting the distribution of the rods, reinforcing material, or elastic material in the wing chord may allow the bending stiffness in the wing chord direction to be changed in response to the distribution in the wing chord direction if necessary.

INDUSTRIAL APPLICABILITY

The aircraft wing according to the present invention may be applied to a wing in aircraft or other flying vehicles, in particular in aircraft or other flying vehicles with morphing aircraft technology so that the shape of the wing can be changed during flight. Also, the aircraft wing composite material and method of manufacture thereof according to the present invention may be suitably applied to manufacture the above aircraft wing.

The invention claimed is:

1. An aircraft wing, comprising:
   a wing inner plate formed in a corrugated shape made from a first reinforcing material having at least one direction of anisotropy, and formed so that the direction of maximum anisotropic stiffness is perpendicular to or substantially perpendicular to a corrugation direction; and
   a wing outer plate made from a second reinforcing material having at least one direction of anisotropy and formed so that the direction of maximum anisotropic stiffness coincides with that of said wing inner plate, wherein the corrugation of said wing inner plate is oriented so as to be parallel to or substantially parallel to a wing chord direction.

2. The aircraft wing according to claim 1, wherein the concave portion of said wing inner plate is filled with an elastic material.

3. The aircraft wing according to claim 1, wherein at least one of said first reinforcing material or said second reinforcing material is a fiber-reinforced material.

4. The aircraft wing according to any one of claims 1 to 3, wherein reinforcing members made from a third reinforcing material having at least one direction of anisotropy and formed so that the direction of maximum anisotropic stiffness coincides with that of said wing inner plate, are provided in the concave portions of said wing inner plate.

5. The aircraft wing according to claim 4, wherein said third reinforcing material is a fiber-reinforced material.

6. An aircraft wing composite material, comprising:
   an inner plate formed in a corrugated shape made from a first reinforcing material having at least one direction of anisotropy, and formed so that the direction of maximum anisotropic stiffness is perpendicular to or substantially perpendicular to a corrugation direction; and
   an outer plate made from a second reinforcing material having at least one direction of anisotropy and formed so that a direction of maximum anisotropic stiffness coincides with that of said inner plate.

7. The aircraft wing composite material according to claim 6, wherein the concave portion of said inner plate is filled with an elastic material.

8. The aircraft wing composite material according to claim 6, wherein at least one of said first reinforcing material or said second reinforcing material is a fiber-reinforced material.

9. The aircraft wing composite material according to any one of claims 6 to 8, wherein reinforced members made from a third reinforcing material having at least one direction of anisotropy and formed so that the direction of maximum anisotropic stiffness coincides with that of said inner plate, are provided in the concave portions of said inner plate.

10. The aircraft wing composite material according to claim 9, wherein said third reinforcing material is a fiber-reinforced material.

* * * * *